US007770123B1

(12) United States Patent
Meyer et al.

(10) Patent No.: US 7,770,123 B1
(45) Date of Patent: Aug. 3, 2010

(54) METHOD FOR DYNAMICALLY GENERATING A "TABLE OF CONTENTS" VIEW OF A HTML-BASED INFORMATION SYSTEM

(75) Inventors: Gordon R. Meyer, San Jose, CA (US); Albert R. Howard, Jr., Fremont, CA (US); Kevin Knabe, San Jose, CA (US); Richard B. Hoiberg, Gilroy, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 09/074,544

(22) Filed: May 8, 1998

(51) Int. Cl.
*G06F 3/00* (2006.01)
(52) U.S. Cl. .................. 715/760; 715/713; 715/738; 707/104.1
(58) Field of Classification Search ............ 707/101, 707/102, 104, 513, 104.1; 715/234–236, 715/705–715, 738, 739, 760, 853, 855
See application file for complete search history.

(56) References Cited

U.S. PATENT DOCUMENTS

| 4,999,806 | A |   | 3/1991  | Chernow et al. |
|-----------|---|---|---------|----------------|
| 5,155,847 | A |   | 10/1992 | Kirouac et al. |
| 5,408,655 | A |   | 4/1995  | Oren et al. ................. 707/1 |
| 5,410,703 | A |   | 4/1995  | Nilsson et al. |
| 5,421,009 | A |   | 5/1995  | Platt |
| 5,530,852 | A | * | 6/1996  | Meske et al. ............. 709/206 |
| 5,557,722 | A | * | 9/1996  | DeRose et al. ............ 715/513 |
| 5,564,051 | A |   | 10/1996 | Halliwell et al. |
| 5,630,117 | A |   | 5/1997  | Oren et al. .................... 707/2 |
| 5,781,904 | A |   | 7/1998  | Oren et al. ................ 707/102 |
| 5,848,410 | A | * | 12/1998 | Walls et al. .................. 707/4 |
| 5,933,599 | A | * | 8/1999  | Nolan ..................... 715/734 |
| 5,963,208 | A | * | 10/1999 | Dolan et al. .............. 715/760 |
| 5,983,171 | A | * | 11/1999 | Yokoyama et al. .......... 704/10 |
| 6,003,046 | A | * | 12/1999 | Nielsen .................... 715/513 |
| 6,035,119 | A | * | 3/2000  | Massena et al. ........... 717/100 |
| 6,041,331 | A | * | 3/2000  | Weiner et al. ......... 707/103 R |
| 6,055,544 | A | * | 4/2000  | DeRose et al. ............ 707/104 |
| 6,105,044 | A | * | 8/2000  | DeRose et al. ............ 715/514 |
| 6,292,802 | B1| * | 9/2001  | Kessenich et al. ......... 707/101 |
| 6,557,054 | B2|   | 4/2003  | Reisman |

* cited by examiner

*Primary Examiner*—Ba Huynh
(74) *Attorney, Agent, or Firm*—Buchanan Ingersoll & Rooney PC

(57) ABSTRACT

The present invention discloses a method for dynamically generating an HTML-based information help system. The information help system provides a user with a table of contents of the information that is currently available on the system. The table of contents is generated by scanning specific files for meta-tag information. The gathered information is merged with pre-defined HTML template files that control the formatting and presentation of the information. The resulting table of contents which is provided to the user accurately reflects the current content of the information system. By dynamically generating the table of contents for the information help system, the present invention allows authors to add, remove, and change individual components of the system while ensuring that users are presented with an accurate and complete list of the information available for use.

16 Claims, 7 Drawing Sheets

1110 📁 Help
    1120 📄 Help_Center.html
    1130 📁 Help_Viewer
    1140 📁 Mac_OS_Help
    1150 📁 Microsoft_Word_Help

FIG. 11

1120 📁 Help Viewer
    1210 ◆ help viewer
    1220 📄 hlpcntrtmpl.html
    1230 📄 srchtips.html
    1240 📁 gfx
        📄 hlpcntr.gif
        📄 srchrslts.gif
        📄 srchtips.gif

FIG. 12

1140 📁 Mac_OS_Help
    1310 📄 Mac_OS_Help.html
    1320 📄 Menu items
    1340 📄 toc.html
    1350 📄 toctmpl.html
    1330 📁 prt
        📁 man

FIG. 13

📁 prt
    📄 prttoc.html
    📄 prttopics.html
    📄 prtindex
    📁 prtselect
    📁 prttrbl

FIG. 14

METHOD FOR DYNAMICALLY GENERATING A "TABLE OF CONTENTS" VIEW OF A HTML-BASED INFORMATION SYSTEM

BACKGROUND

The present invention relates generally to on-line help systems and, in particular, to a method for providing an up-to-date table of contents of the help topics that are currently available to a user of the system.

It is common practice for programmed data processing systems to provide on-line assistance to an operator or user in response to a request for help, by displaying help information to the operator at a workstation. The assistance may consist of actual help information or of a menu or index of possible help topics from which the operator can select an item of interest.

Conventional help systems require an author to create a table of contents that reflects the individual components (akin to "chapters" and "books") that are known to exist on the system. Typically, the table of contents includes links to various files that contain the desired help information to assist the user in navigating to that information. For this purpose, the table of contents might be written in a format such as that provided by the Hypertext Markup Language (HTML), which facilitates such linking. The HTML links (i.e., HREFs) that lead to each chapter or book must be hard-coded to reflect the current location of the help information files. Once the information for the help system is installed on a user's computer, it is vulnerable to broken links because users can move or delete files, or web servers can change locations. This results in at least some portion of the table of contents ceasing to be functional. Additionally, if new information is added to the system by installing new software components, the new information will not appear in the pre-authored table of contents. This results in inaccessible or "orphan" content.

In the past, therefore, authors had to be careful to maintain existing links and fit their content within specific areas that were designated at the creation of the help system. Most links and document hierarchies were frozen, with only minimal customization possible and no cross-document linking permitted. This static type of system is not viable for large, comprehensive, and extensible help systems.

Other systems have been developed to provide users with available help information. One example of such a system is Microsoft WinHelp, which provides a table of contents view which is compiled by the author. The system provides the contents of the system that are available at the time of compilation. However, this system fails to provide the user with an up-to-date listing of available system information which is reflective of changes made to the system after the compilation (i.e., the system is not a dynamically-generated system).

Netscape NetHelp also provides a table of contents view. The table of contents view is implemented in JavaScript, using information provided by the author. This system, like the Microsoft WinHelp system, fails to reflect changes to the system occurring after the time of compilation.

SUMMARY

The present invention overcomes the above-identified limitations in the art by automatically providing a user with a table of contents that is reflective of the information that is currently available on the system. The table of contents is generated by scanning specific files for pre-defined information, such as HTML meta-tags. The information gathered is merged with pre-defined HTML template files that control the formatting and presentation of the information. The resulting table of contents which is provided to the user accurately reflects the current content of the information system.

Dynamically generating a table of contents for an information system allows authors to add, remove, and change individual components of the system while ensuring that users are presented with a complete and up-to-date list of the information available for use.

The present invention offers the advantages of creating a table of contents on demand, based on the current contents of the information system being accessed. Authors are not required to know the sum-total of the information system. No compilation of the files that make up the system is necessary. All files are text-based, and in a standard format, such as HTML. The format of the table of contents is determined by pre-authored template files. This allows each module to have its own style of presentation.

The present invention is also scalable. Exemplary embodiments generate a two-level table of contents. One level provides a list of all available "books" on the system while the second level provides a list of the "chapters" in each book. Other implementations of the present invention contemplate providing the user with third, fourth, or deeper levels of content. The present invention also allows for the content that is stored outside of the local information system, such as on the Internet, to be included in the table of contents through the use of additional meta-tags.

BRIEF DESCRIPTION OF THE DRAWINGS

The above objects and features of the present invention will be more apparent from the following description of the preferred embodiments with reference to the accompanying drawings, wherein:

FIG. 11 illustrates the content of the help folder according to the present invention;

FIG. 12 illustrates the content of the help viewer folder according to the present invention;

FIG. 13 illustrates the content of another help folder according to the present invention; and FIG. 14 illustrates the content of the print chapter according to the present invention.

DETAILED DESCRIPTION

To facilitate an understanding of the present invention and the advantages offered thereby, features of the invention are often described and illustrated with reference to the use of the invention in a computer running the Macintosh® operating system (Mac OS) developed by Apple Computer, Inc. It will be appreciated by those having familiarity with the relevant technology, however, that the principles of the present invention are not limited to this particular type of operating environment. Rather, the concepts which underlie the invention are applicable to any type of computer operating environment in which it is desirable to provide a user with computer-aided assistance.

Figure 1:
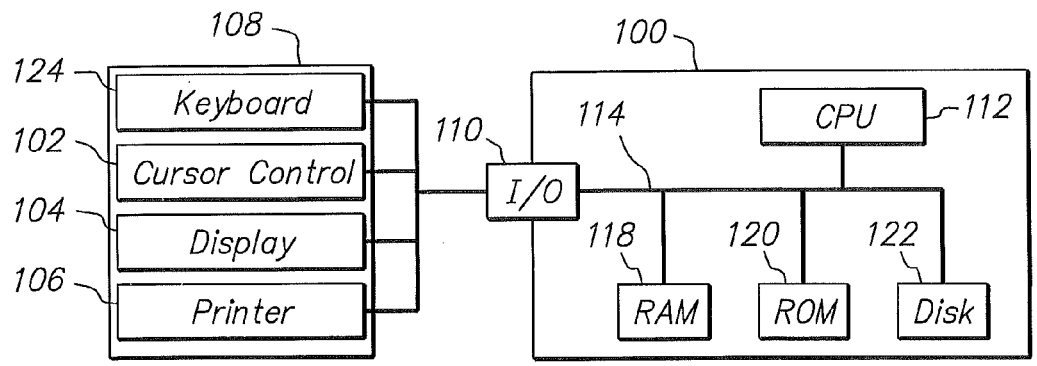
FIG. 1 illustrates an exemplary computer system in which the help system of the present invention may be implemented.

An exemplary computer system, of the type in which the present invention can be employed, is illustrated in block diagram form in FIG. 1. The structure of the computer itself does not form part of the present invention. It is briefly described here for subsequent understanding of the manner in which the features of the invention cooperate with the structure of the computer.

Referring to FIG. 1, the system includes a computer 100 having a variety of external peripheral devices 108 connected thereto. The computer 100 includes a central processing unit 112, a main memory which is typically implemented in the form of a random access memory 118, a static memory that can comprise a read only memory 120, and a permanent storage device, such as a magnetic or optical disk 122. The CPU 112 communicates with each of these forms of memory through an internal bus 114. The peripheral devices 108 include a data entry device such as a keyboard 124, and a pointing or cursor control device 102 such as a mouse, trackball or the like. A display device 104, such as a CRT monitor or an LCD screen, provides a visual display of the information that is being processed within the computer, for example the contents of a document. A hard copy of this information can be provided through a printer 106, or similar device. Each of these external peripheral devices communicates with the CPU 112 by means of one or more input/output ports 110 on the computer. Input/output ports 110 also allow computer 100 to interact with a local area network server or an external network, such as the Internet.

Computer 100 typically includes an operating system which controls the allocation and usage of the hardware resources such as memory, central processing unit time, disk space, and peripheral devices. In addition to an operating system, computer 100 also generally includes some type of help system which provides the user with computer-aided assistance. Although described separately herein, the help system could reside as a component of the operating system or could be stored on any type of machine-readable medium, such as disk 122.

Figure 2:
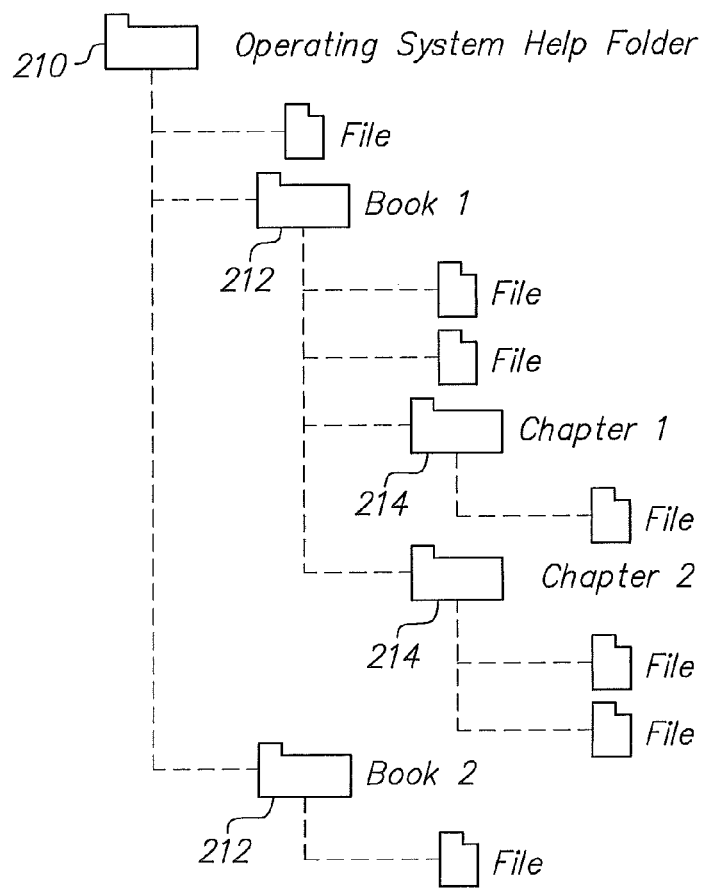
FIG. 2 illustrates the hierarchical layout of the help system of the present invention.

The layout of the help system, according to an exemplary embodiment of the present invention, is set forth in FIG. 2. As is evident from FIG. 2, the layout of the help system is hierarchical and includes a number of folders, sub-folders and files. The operating system help folder 210 is the centralized folder in which the help information for the computer system is stored.

In the illustrated embodiment of the present invention, folders 212 which are one level deep within the operating system help folder are referred to as "books." While the operating system help folder in FIG. 2 comprises only two books 212, one skilled in the art will recognize that the help folder could comprise any number of books. The individual books 212 of the present invention include files and may also include sub-folders 214. The sub-folders 214, which are those folders two levels deep within the operating system help folder, are referred to hereinafter as "chapters." As recognized by those skilled in the art, the chapters contain files and may contain additional sub-folders.

Figure 3:
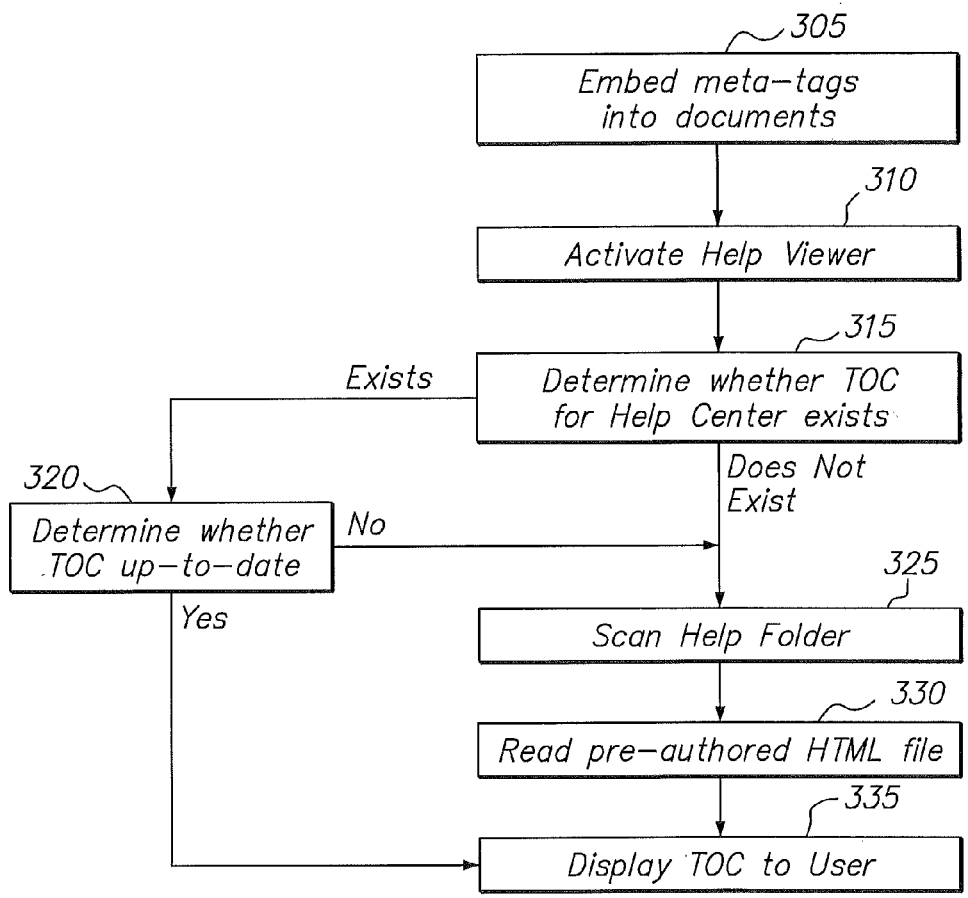
FIG. 3 illustrates a flow chart which provides a brief overview of the operation of the help system of the present invention.

With that brief overview of the layout of the help system of the present invention, the operation of the help system is now described with reference to FIG. 3. In step 305, meta-tags are embedded into the files of the help system during a content creation process. These tags provide the information used during table of contents generation. Where possible, industry established meta-tags, such as those used by Internet search engines, are employed. Other meta-tags, as will be discussed in detail below, are also added.

In step 310, a user activates the help viewer of the present invention by, for example, selecting help from a help menu. When activated, the help viewer first determines whether a table of contents for the help system already exists (step 315). If it does already exist, the help viewer determines in step 320 whether the table of contents is up-to-date. This determination is made by comparing the last modification date of the files in the operating system help folder to the last date in which the table of contents was modified. If the help folder indicates that a file has been modified since the last time the table of contents was generated, the table of contents has to be regenerated. If the help viewer determines that the table of contents is up-to-date, then it is immediately displayed to the user (step 335).

If either of steps 315 or 320 result in a negative response (i.e., that the table of contents does not exist or is not up-to-date), then the help viewer begins the process of generating or regenerating the table of contents. The first step in the generation process is to scan the help folder for files of the type "TEXT" and creator "hbwr" (step 325). The help system of the instant invention facilitates generation of the table of contents by using text files. This eliminates the compilation step associated with table of contents generation of conventional systems. By using text files, the help system can quickly and easily identify potential files to be used for the table generation. In order to further expedite file identification, a creator designation is added to certain files to aid in the filtering process. While the instant invention uses a creator designation of "hbwr," those skilled in the art will recognize that other creator designations may be employed. In addition, or as an alternative, other techniques can be used to designate a creator and otherwise uniquely identify help-related files, such as a particular extension in the known 8.3 file naming conventions.

Each of the files identified as text files with the proper creator designation are opened and examined for the meta-tags needed to generate the table of contents. After all the appropriate files have been scanned, the help viewer, in step 330, reads a pre-authored HTML template file containing text that indicates how the information culled from the meta-tags is to be formatted for presentation.

Finally in step 335, the generated table of contents is displayed to the user. As a result, the user is provided with the most up-to-date listing of help information available on the system.

Figure 4:
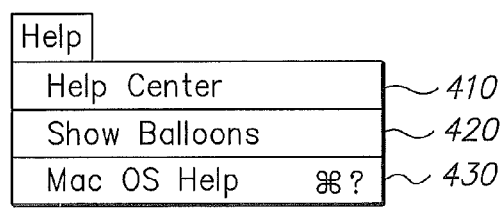
FIG. 4 illustrates an exemplary Help menu.

A user generally gains access to a help system through a Help menu, Help buttons or double-clickable icons. An example of a Help menu is illustrated in FIG. 4. The menu includes the following menu items:

Help Center (410): Choosing this item opens the user's viewer of choice and displays a menu of all "books" in the help system.

Show/Hide Balloons (420): Turns Balloon help on and off.

<Application> Help (430): Choosing this item opens the viewer and displays the splash page for the active application's help system. In this particular example, the active application is the computer's operating system.

Other menu items, such as Tutorial, may also be appended to the Help menu by a specific application.

Figure 5:
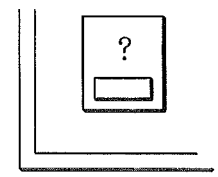
FIG. 5 illustrates a conventional Help button.

A second method for gaining access to the help system is by clicking a Help button. By clicking a Help button in a control panel or dialog box, the user is given access to specific help content. FIG. 5 illustrates a typical Help button.

The third method by which a help system is commonly accessed is by double-clicking a specific icon. Developers can give special emphasis to certain information by placing aliases of help documents on the computer's local hard disk. For example, a new release of an operating system might include a "What's New" document. By double-clicking the "What's New" icon, the user is given access to the desired information.

I. The Help Viewer

Figure 6:
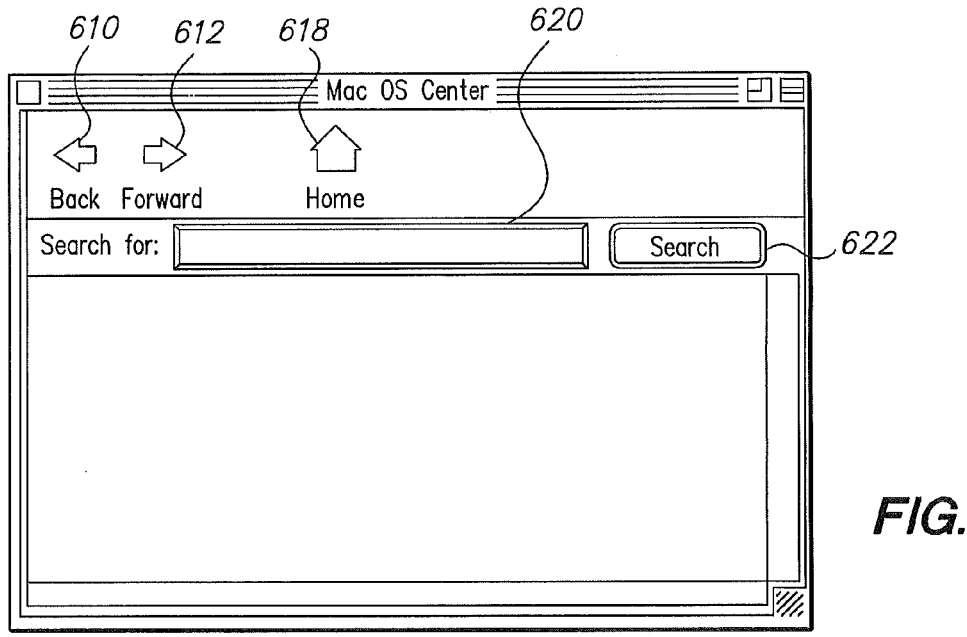
FIG. 6 illustrates a help viewer according to the present invention.

Once the user accesses the help system by any one of the preceding methods, a help viewer window is displayed. This window presents a high-level overview of the topics that are available to assist the user in connection with the active application. The help viewer window, as illustrated in FIG. 6, includes standard window controls: a title bar, a close box, a zoom box, a collapse box, vertical and horizontal scroll bars, and a size box. The title of the window displays the title of the current book or the help center heading.

The viewer's button bar includes standard viewer buttons, such as Back 610 and Forward 612. The viewer's button bar also includes a Home button 618 that takes the user to the help center home page. Below the button bar is a field for typing a search query 620 and a search button 622. The insertion point appears in the field 620 when the window is first opened. A status bar appears at the bottom of the window. The help viewer window may also include a menu bar (not shown) to add greater functionality to the help viewer.

II. The Help Center

Figure 7:
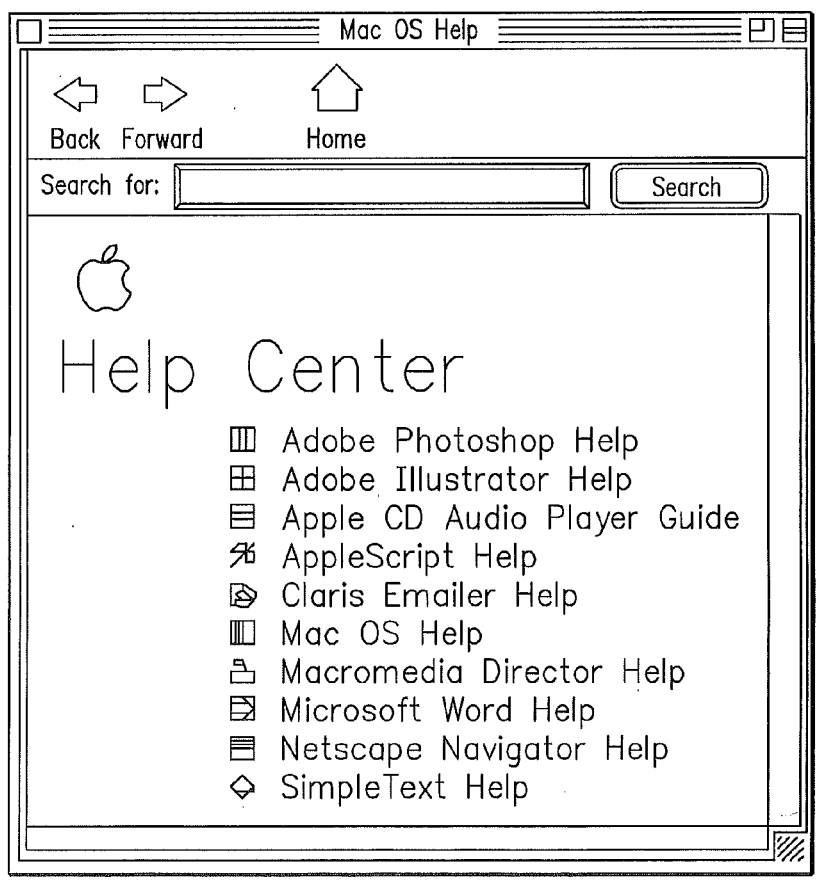
FIG. 7 illustrates a help center home page according to the present invention.

The help center, as illustrated in FIG. 7, provides the user with a dynamically-generated list of those help resources currently available on the computer system. A user can go to the help center in any of the following ways: choosing help center from the Help menu; clicking the Home button in the help viewer window; or double-clicking the help viewer application icon.

Figure 8:
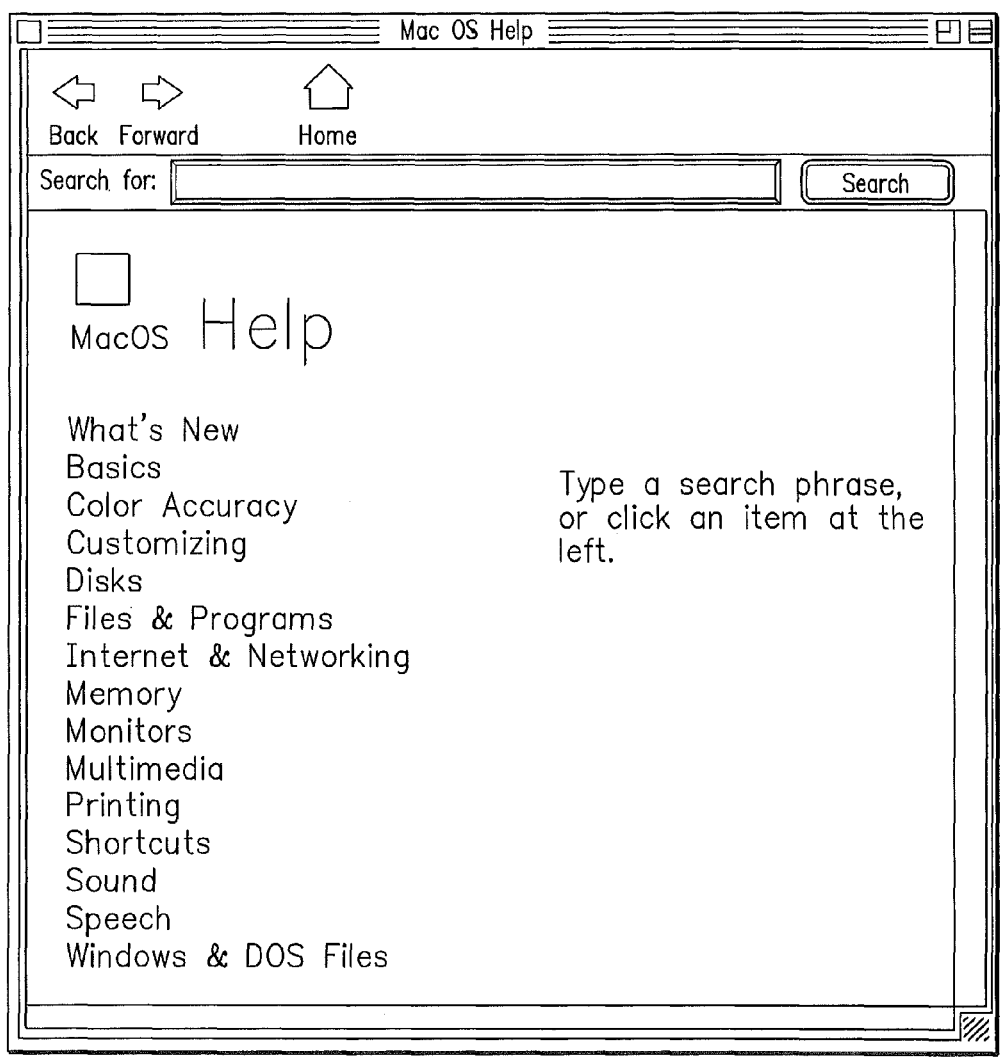
FIG. 8 illustrates a splash page for a help book according to the present invention.

If the user clicks a book, the viewer displays the splash page for that book (i.e., the viewer displays the contents of that book). For example, if the user clicks on the operating system help book, the resulting splash page lists those chapters included in the operating system help book. FIG. 8 displays a sample splash page for the operating system help book.

A. Tables of Contents for Individual Books

Choosing help from the Help menu for an active application (for example, "Mac OS Help") opens the help viewer and displays a splash page for that particular book (see FIG. 8). The left frame of the splash page lists all the "chapters" of the book. The right frame displays a prompt. In FIG. 8, the right frame prompts the user to either type in a search phrase or click on a chapter in the book.

Figure 9:
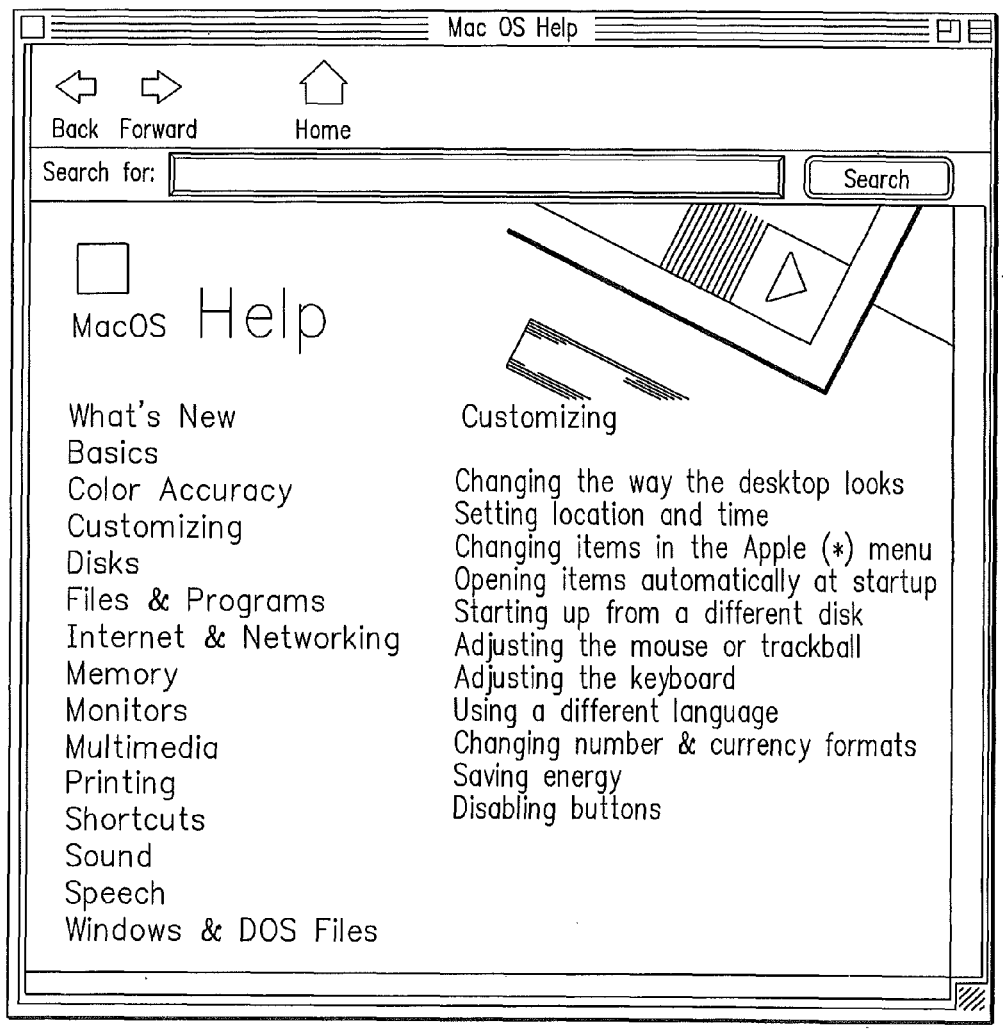
FIG. 9 illustrates a splash page for a chapter according to the present invention.

When the user clicks a chapter in the left frame, a list of related documents and/or Web sites appears in the right frame. Referring now to FIG. 9, a click from the user on the "Customizing" chapter results in a list of related documents being displayed in the right frame. If the user clicks one of the documents or Web sites listed in the right frame, the viewer goes to that page, replacing the entire contents of the window.

B. Searching

As indicated above, the help viewer provides a user the capability to search for a particular topic of interest. In order for a book or chapter to be searchable, it must have an index file representing its contents. This file is generated through the use of a HTML Indexing Tool. This tool analyzes the text (HTML) files contained in a folder and generates an index file that represents the contents of that folder. The newly created index file is placed inside of the folder whose contents it represents. The file name, according to exemplary embodiments of the present invention, is preferably "<folder name> index".

The HTML Indexing Tool analyzes every file in the folder of type "TEXT" and having the proper creator designation. Every text file can be returned as a search result. There are several HTML meta-tags that can be used to control the indexing of the HTML files by the HTML Indexing Tool. Listed below are exemplary meta-tags that can be used in this context.

<META NAME="Robots" CONTENT="INDEX">

The Robots meta-tag can be used to control indexing behavior. Possible values are INDEX, NOINDEX, and SEGMENTS. A value of NOINDEX causes this file to not be indexed at all. A value of SEGMENTS causes only specified segments to be indexed as possible search results. A value of INDEX causes the entire file to be indexed as a possible search result. The default value is preferably INDEX.

<META NAME="DESCRIPTION" CONTENT="text string">

<!--Abstract="text string"-->

The DESCRIPTION meta-tag and the Abstract comment can be used to display an abstract in the search results if this article is returned as a potential match. The meta-tag is used when an abstract applies to an entire file; the comment is used when the abstract applies only to an article within the file.

<!--SegStart="Locking A Disk"-->

The SegStart comment can be used to delineate multiple segments, or articles, within a single file. This allows one HTML source file to contain several articles, each of which can be returned as a separate "hit" in a search. For each SegStart there is a matching SegEnd comment. If the segment is associated with a HTML link in the page, the link is located between the SegStart and SegEnd comments. This way, if the user clicks on the link associated with the segment in the search results, they are taken to the correct location within the file.

<!--SegEnd-->

This indicates the end of a segment.

<META NAME="KEYWORDS" CONTENT="memory, virtual, losing">

The KEYWORDS meta-tag can be used to control indexing behavior. Normally, only words that are NOT between the < > markers are indexed. If there is a need to index words that are not part of the given file, additional keywords may be entered using the KEYWORDS meta-tag, or a Keywords comment. The meta-tag should be used if the keywords apply to the entire file. The Keywords comment should be used between the SegStart and SegEnd comments for keywords that apply only to a particular article within a file.

1. Placing the Index Files

Figure 10:
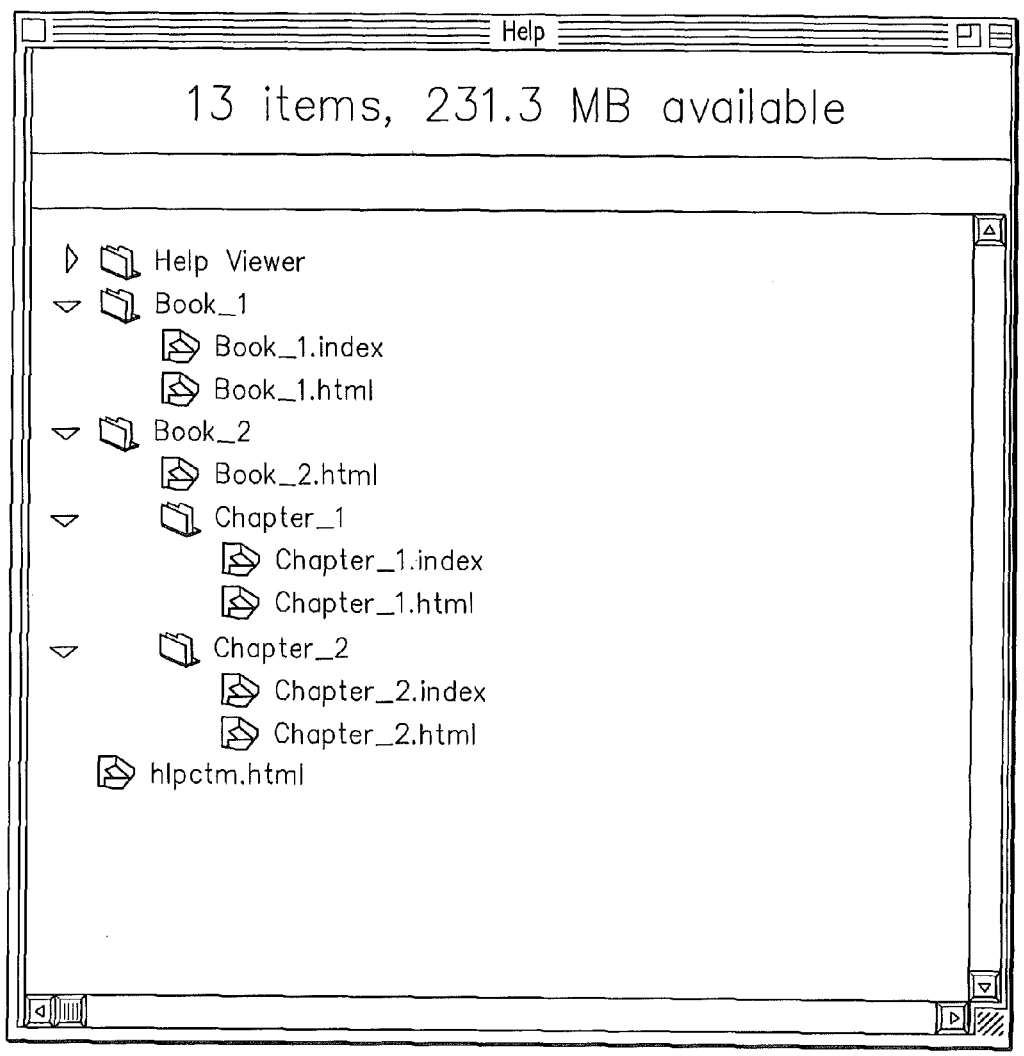
FIG. 10 illustrates the placement of index files in the books and chapters of a folder according to the present invention.

FIG. 10 illustrates the placement of index files in folders. There may be one index file for an entire book (Book 1, for example), or one per chapter (Book 2, for example). Having one index per chapter allows the developer to update a single chapter without having to replace the entire book. The one index per book scenario requires replacing the entire book if a single chapter (and thus the index file) changes. In either case, the index file must be placed in the folder that it represents (which is where it is placed when the index file is created by the HTML Indexing Tool).

2. Using the Index Files in Searches

At launch, the help viewer of the present invention creates a list of all files of type "TEXT" and creator "hbwr" contained in the operating system help folder. This list of files is cross-referenced with a list of all the books installed in the system. When a user performs a search in the help viewer the following events occur:

1) The "current book" is determined based on the currently displayed web page. If the current web page is the help center, then all books are searched.

2) Only the index files associated with the "current book" are searched.

3) A HTML file is generated with a list of search results and their links. The viewer displays this newly generated page.

C. File Organization

The following section illustrates how the contents of the operating system help folder, help viewer folder, books and chapters are organized according to the present invention.

1. Contents of the Help Folder

Inside the operating system folder of the present invention is a designated folder 1110 named "Help," which contains the following items, as illustrated in FIG. 11:

Help_Center.html 1120: a dynamically generated page of HTML which is used to display the help center window;

a help viewer folder 1130; and a folder for each book in the help system.

In FIG. 11, for example, the Help folder 1110 contains an operating system help book 1140 and a word processing help book 1150.

2. Contents of the Help Viewer Folder

The contents of the help viewer folder 1120 is illustrated in FIG. 12. It contains:

the help viewer application 1210;

hlpcntrtmpl.html 1220: a template used for generating the Help_Center.html file;

srchtips.html 1230: the Search Tips page; and a graphics folder 1240, which contains graphics for the help center, Search Results, and Search Tips pages.

3. Contents of a Book

The contents of an individual book is illustrated in FIG. 13. As illustrated in FIG. 13, the operating system help book (i.e., the Mac OS Help book) 1140 contains:

an HTML file 1310 that contains the meta-tags needed to list the book in the help center;

a database 1320 specifying the names and URLs for items in the Help menu; and a folder 1330 for each chapter in the book.

If the book uses a dynamically generated table of contents, it also includes:

toc.html (1340): a dynamically-generated file used to display the left frame of the book's table of contents; and toctmpl.html (1350): a file used to generate the left frame of the book's table of contents.

If the book does not use a dynamically-generated table of contents, it includes an index file in the root level folder for the book.

4. Contents of a Chapter

A chapter contains the HTML files, Graphics files (e.g. gif files), scripts, and databases used in the chapter. If the chapter is to appear in a dynamically-generated table of contents, it preferably includes:

a file at the root level of the chapter containing the meta-tags used by the table of contents generator; and a pre-compiled index for the chapter.

FIG. 14 illustrates a sample file layout of the chapter directed to printing topics. As set forth above, the pre-compiled index is used in the searching process.

D. Building the Dynamic Table of Contents

There are two parts to the dynamic table of contents of the present invention: the list of books displayed when the user goes to the help center, and the list of topics (or chapters) displayed when the user selects one of the available books. The present invention allows the list of books displayed in the help center to be updated as users install new software, and as new books become available. The help system of the present invention is not limited to only displaying information that is available locally (i.e., on the computer's hard drive), but may also be structured to display information that is available remotely. For example, the help system may be designed to also retrieve and display available information from a local area network server, the Internet, or any other remote source. If a particular book from a remote source is not available when the help viewer is accessed, then it is not displayed to the user.

1. The Help Center Table of Contents

The help center home page is generated by the help viewer and displayed, as discussed previously, in response to the user choosing the help center from the Help menu, clicking the Home button in the help viewer window, or double-clicking the viewer application icon.

There are two instances when the help center home page, with its corresponding table of contents, is generated or regenerated by the help viewer. The first instance is when the help center home page does not already exist (i.e., before the help viewer generates the help center home page for the first time). The second instance is when a modification to the system necessitates such a regeneration. For example, when files have been added, deleted or modified, the help center home page must be regenerated in order to reflect these changes. The present invention makes the determination of whether to regenerate the help center home page by comparing the last modification date of the files in the operating system help folder to the last date in which the help center home page was regenerated. If the help folder indicates that a file has been modified since the last time the help center home page has been generated, then the help viewer regenerates the home page in order to reflect those changes.

When the help center home page is to be generated or regenerated, the help viewer indexes through every file that is one level deep in the help folder. Referring to FIG. 11, for example, the help viewer indexes through all files in the Mac_OS_Help folder 1140 and all files in Microsoft_Word_Help folder 1150. When a HTML source file of type "TEXT" is found with the appropriate creator designation, it is scanned for special HTML meta-tags that identify this as a book that should be added to the help center. In an exemplary embodiment, the help viewer looks for the following tags:

<META NAME="Title" CONTENT="The OS and You">

This tag gives the book's title as displayed in the help center.

<META NAME="URL" CONTENT="http://utility.abcinc.com">

This tag is optional. It specifies a destination URL when the link is clicked in the help center. If no link is specified, a click on the book's title takes the user to this file.

<META NAME="Icon" CONTENT="Operating_System_Help/Graphics/BookIcon.gif">

This tag is also optional. It specifies an icon to be displayed next to the book's title in the Help Center. The path to the file should be relative to the Help_Center.html file (i.e., the help center HTML file) being generated. If no icon is specified, a default one is provided.

Once a table has been created with the information for all the books in the help center, the Help_Center.html file is created. This file is created in a manner similar to the way in which a mail-merge application might work. A template is used, and information for each book is entered to create the help center home page, just as addresses might be substituted in a form letter. The creation of a template for the help center home page, according to the instant invention, is discussed in detail below.

The Help_Center.html file is generated based on an HTML template file. This template file is copied over to the Help_Center.html file line for line until an HTML comment with the token TOCRowBegin is found. Between the comments associated with the tokens TOCRowBegin and TOCRowEnd, the tokens Title, URL and Icon are replaced with the information for each book found in the help folder. This process is repeated for every book in the table. Once all the data for each book has been entered, the rest of the template file (i.e., after the HTML comment with the TOCRowEnd token) is copied over verbatim.

2. The Table of Contents for Each Book

In addition to the generation of the table of contents for the help center, the help viewer also generates a file with the table of contents for each book installed in the help system. This file can then be used by the program developer when displaying the main page of that book.

The help viewer generates a file called "toc.html" in the root folder of each book (e.g., inside the Help:Mac_OS_Help folder in FIG. 11). One of the following conditions can cause this file to be regenerated when the help viewer is launched: the file doesn't already exist or the last modification date of the book's folder (e.g., Help:Mac_OS_Help) is later than that of the book's "toc.html" file.

When the "toc.html" file is to be generated or regenerated, the help viewer indexes through every file that is one level deep in the book's folder. Referring to FIG. 13, for example, the help viewer indexes through all files in Help:Mac_OS_Help:prt folder and all files in Help:Mac_OS_Help:mon folder. When an HTML source file of type "TEXT" is found having the appropriate creator designation, it is scanned for special HTML meta-tags that identify this as a chapter that should be added to the book's table of contents. Continuing with the foregoing exemplary embodiment, the following tags are looked for, and added to a table containing information about this particular book's chapters:

<META NAME="Title" CONTENT="Chapter 1: OS Introduction">

Gives the chapter's title that is listed in the books table of contents.

<META NAME="URL" CONTENT="http://utility.abcinc.com">

This tag is optional. It specifies a URL to go to when the link is clicked. If no link is specified, a click on the book's title takes the user to this file.

<META NAME="Icon" CONTENT="Graphics/BookIcon.gif">

This tag is also optional. It specifies an icon associated with the given chapter. The path to the file should be relative to the toc.html file being generated. If no icon is specified, a default icon is provided.

<META NAME="Target" CONTENT="right">

This tag is optional. It associates a target frame with the given chapter. This tag allows for the display of the table of contents in the left hand frame of the screen, and chapter specific information in the right hand frame. Possible values for the Target tag depend on how the developer organizes frames. If no value is specified, the value is preferably "_top" which forces the page to take over the available viewer window.

<META NAME="Order" CONTENT="80">

This tag is optional. It is used to force an ordering of the book's chapters when the toc.html file is being generated. The chapters are listed based on the Order value; chapters with no Order tag are listed last. If there is more than one chapter with the same Order value, those chapters are sorted alphabetically.

Once a table has been created with the information for all the chapters in the book, the toc.html file is created. This file is generated based on an HTML template file. If there is a text file in the book's directory named toctmpl.html, it is used. This file is copied over to toc.html file line for line until a comment with the token TOCRowBegin is found. Between the comments associated with the tokens TOCRowBegin and TOCRowEnd, the tokens Title, URL, Icon and Target are replaced with the information for each book found in the help folder.

Once all the data for each chapter has been copied to the toc.html file, the rest of the template file, after the HTML comment with the TOCRowEnd token, is copied over verbatim.

3. Creating a Template for the Dynamic Table of Contents

In order to have the help viewer generate a dynamic table of contents, a template file is used. The template file preferably appears at the root level of the book's folder.

The template file contains standard HTML for the header and footer of the table of contents. In the middle of the template are TOCRowBegin and TOCRowEnd statements. Between these two statements is the format for a single table of contents entry.

The following example shows a template in which each row of the table of contents is a paragraph displaying an icon and a title.

<!--TOCRowBegin-->
　<A HREF="URL" TARGET="Target"> Title</A>
<!--TOCRowEnd-->

4. Adding a Book or Web Site to the Help Center

In order to have a book listed on the help center, an HTML document with appropriate creator designation is placed at the root level of the book's folder. This document contains Title and Icon meta-tags as in the example below:

```
<META NAME="Title" CONTENT="OS Help">
<META NAME="Icon" CONTENT="OS_Help/gfx/logo.
    gif">
```
To have a Web site listed on the help center page, the developer also includes an URL meta-tag. For example:
```
<META NAME="Title" CONTENT="ABC Web Site">
<META NAME="Icon" CONTENT="ABC_Web_Site/
    logo.gif">
<META NAME="URL" CONTENT="http://www.abc.
    com">
```

5. Adding a Document or Web Site to a Book's Table of Contents

To have a chapter listed in the left frame of a book's content page, an author must include a folder for the chapter at the root level of the book's folder. It is necessary that the folder include an HTML document with the appropriate creator designation and the Title, Order and Target meta-tags. It may also include the Icon meta-tag. For example:
```
<META NAME="Title" CONTENT="Speech">
<META NAME="Icon" CONTENT="Graphics/Bullet.
    gif">
<META NAME="Order" CONTENT="80">
<META NAME="Target" CONTENT="right">
```
To have a Web Site listed in the left frame of a book's contents page, the developer must also include an URL meta-tag. For example:
```
<META NAME="Title" CONTENT="System OS Web
    Site">
<META NAME="Icon" CONTENT="Graphics/Globe.
    gif">
<META NAME="URL" CONTENT="http://www.syste-
    mos.com">
<META NAME="Order" CONTENT="50">
<META NAME="Target" CONTENT="_top">
```

G. Language Reference Guide

The following is a reference guide to the meta-tags and comments used in the present invention.

Abstract
Syntax: `<!--Abstract="text string"-->`
Example: `<!--Abstract="text string"-->`

This comment is used to provide a brief introduction with the title of an article on the Search Results page. The comment may appear anywhere within a document or within a segment.

Icon
Syntax: `<META NAME="Icon" CONTENT="href">`
Example: `<META NAME="Icon" CONTENT="Graphics/Logo.gif">`

This meta-tag is used to specify the HREF attribute for a graphic displayed in a dynamic table of contents. The href is relative to the location of the contents file being generated.

Robots
Syntax: `<META NAME="Robots" CONTENT="INDEX|SEGMENTS|NOINDEX">`

This meta-tag is used to specify whether a file is indexed. This meta-tag can specify that the whole document be indexed (i.e., the top of the document, as well as all segments in the document), segments only, or none of the document be indexed. The default is preferably "INDEX."

Order
Syntax: `<META NAME="Order" CONTENT="integer">`

This meta-tag is used to specify the order of items in a dynamic table of contents. Items with a lower number appear at the top of the list. If an Order value is not specified, the item appears at the bottom of the list. In case of ties, items are sorted alphabetically by name.

SegStart and SegEnd
Syntax: `<!--SegStart="segment name"-->`
    segment content
    `<!--SegEnd"-->`
Example: `<!--SegStart="Selecting a network printer"-->`
    segment content
    `<--!SegEnd"-->`

This comment is used to index a portion of a document.

Target
Syntax: `<META NAME="Target" CONTENT="target">`
Example: `<META NAME="Target" CONTENT="right_frame">`

This meta-tag specifies the target associated with a link in the help center or in a dynamic table of contents. The default is preferably "_top," meaning the link replaces the entire content of the window. This tag is generally used only when replacing the contents of a frame or opening a second viewer window.

Title
Syntax: `<META NAME="Title" CONTENT="title">`
Example: `<META NAME="Title" CONTENT="Printing">`

This meta-tag adds the title of a book to the help center or the title of a chapter to a dynamic table of contents. It appears in the heading of a file having the appropriate creator designation at the root level of a book's folder (to add to the help center) or at the root level of a chapter's folder (to add to a dynamic table of contents).

TOCRowBegin and TOCRowEnd
Syntax: `<!--TOCRowBegin-->`
    row template
    `<!--TOCRowEnd-->`

These comments appear in a template file between the header and footer of the contents file to be generated. The row template contains the HTML for displaying a single row in the table of contents. The row template can include any of the following variables: "Title," "Icon," "URL," "Target," and "Order."

URL
Syntax: `<META NAME="URL" CONTENT="href">`
Example: `<META NAME="URL" CONTENT="http://www.abcinc.com">`

This meta-tag specifies the HREF attribute associated with a link in the help center or in a dynamic table of contents. The default is preferably the file in which the meta-tag appeared. This tag is generally used only when it is necessary to point a link elsewhere, such as to a Web site.

From the foregoing, it can be seen that the present invention provides a mechanism for dynamically generating a table of contents for an information presentation system, such as a help system. With this approach, authors are provided with the flexibility to add, remove, and otherwise modify the contents of individual components of the help system, without the need to re-create the table of contents. Each time the system is accessed by a user, the table of contents reflects the currently existing components that can be viewed by the user.

Many variants and combinations of the techniques taught above may be devised by a person skilled in the art without departing from the spirit or scope of the invention as described by the following claims. Although the systems and methods of the present invention have been set forth in an informational help system environment, it will be recognized by those skilled in the art that the instant invention is applicable to any environment where information is provided in a hierarchical manner and where there is a desire for an up-to-date listing of that information.

What is claimed is:

1. A method for displaying a plurality of information topics that are available via an online help system for a computer, comprising the steps of:
    creating a plurality of folders that are respectively associated with said plurality of topics, and storing the folders in a memory of the computer;
    storing, in a hierarchical arrangement, one or more HTML source files of information for given topics, where each file is stored in the respective folder associated with its given topic;
    detecting, by the computer, the selection of one of said plurality of folders, said folder being associated with a topic of interest;
    searching, by the computer, each of the files at the first hierarchical level in the selected folder to identify files of a predetermined type;
    examining, by the computer, each of the identified files to locate HTML metatags that pertain to the display of help information;
    retrieving, from the computer memory, a stored HTML template file;
    merging data associated with the HTML metatags into the HTML template file, by said computer, to thereby generate an HTML file containing data associated with each of the located HTML metatags; and
    displaying, on a display device, an HTML page in accordance with said generated file to thereby provide a table of contents for the topic of interest associated with the selected folder.

2. The method of claim 1, further including the step of filtering the identified files, prior to said examining step, to select files having a predetermined designation.

3. The method of claim 2, wherein said predetermined designation is a creator designation.

4. The method of claim 2, wherein said predetermined designation is a file extension.

5. The method of claim 1, wherein said predetermined type is a text file.

6. The method of claim 1, wherein the step of generating said HTML file comprises the steps of:
    duplicating the contents of said template file; and
    replacing tokens in said file, that correspond to the located metatags, with the associated data from the metatags that were located in each identified file, during said duplicating step.

7. The method of claim 6 wherein said template file is stored in the selected folder.

8. The method of claim 6 wherein said replacing step comprises creating a separate row in said generated file for the respective data from each identified file.

9. An online help system, comprising:
    a memory storing a hierarchy of folders and files, wherein the folders respectively correspond to different topics of information that can be viewed within the help system, and HTML files at the first level of hierarchy within said folders contain metatags associated with data relating to the display of a table of contents for the respective topics to which said folders correspond;
    means responsive to the selection of a topic of interest for searching the files in the folder corresponding to said topic to identify files of a predetermined type;
    means for examining the identified files to locate said metatags;
    means for retrieving a stored HTML template file;
    means for merging data associated with the metatags into said HTML template file to thereby generate an HTML file containing data associated with the located metatags; and
    means for displaying a table of contents for the topic of interest in accordance with said generated file.

10. The system of claim 9, further including means for filtering the identified files, to select files having a predetermined designation.

11. The system of claim 10, wherein said predetermined designation is a creator designation.

12. The system of claim 10, wherein said predetermined designation is a file extension.

13. The system of claim 9, wherein said predetermined type is a text file.

14. The system of claim 9, wherein said merging means performs the function of duplicating the contents of said template file, and replacing tokens in said file, that correspond to the located metatags, with the associated data from the metatags that were located in each identified file, during said duplication.

15. The system of claim 14 wherein said template file is stored in the folder corresponding to the selected topic.

16. The system of claim 14 wherein said generated file comprises a separate row for the respective data from each identified file.

* * * * *